US012695346B2

(12) United States Patent
Tange et al.

(10) Patent No.: US 12,695,346 B2
(45) Date of Patent: Jul. 28, 2026

(54) ANNULAR SILICON STEEL SHEET, CIRCULAR WIRE MOTOR ASSEMBLY, CIRCULAR WIRE MOTOR, AND POWERTRAIN

(71) Applicant: Huawei Digital Power Technologies Co., Ltd., Shenzhen (CN)

(72) Inventors: Hiroshi Tange, Yokohama (JP); Weihua Huang, Xi'an (CN); Qi Cong, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 200 days.

(21) Appl. No.: 18/626,626

(22) Filed: Apr. 4, 2024

(65) Prior Publication Data

US 2024/0339880 A1 Oct. 10, 2024

(30) Foreign Application Priority Data

Apr. 4, 2023 (CN) .......................... 202310389627.X

(51) Int. Cl.
| | |
|---|---|
| *H02K 3/12* | (2006.01) |
| *H02K 1/02* | (2006.01) |
| *H02K 1/16* | (2006.01) |
| *H02K 3/34* | (2006.01) |

(52) U.S. Cl.
CPC ................. *H02K 3/12* (2013.01); *H02K 1/02* (2013.01); *H02K 1/16* (2013.01); *H02K 3/345* (2013.01)

(58) Field of Classification Search
CPC .. H02K 3/12; H02K 1/02; H02K 1/16; H02K 3/345; H02K 2213/03; H02K 1/165; H02K 1/265; H02K 3/28; H02K 3/48; H02K 7/116; Y02T 10/64
USPC ......................................................... 310/208
See application file for complete search history.

(56) References Cited

FOREIGN PATENT DOCUMENTS

| | | | |
|---|---|---|---|
| JP | 2008253014 A | | 10/2008 |
| JP | 2020156298 A | | 9/2020 |
| JP | 20200156298 | * | 9/2020 |
| JP | 2021083183 | * | 5/2021 |
| JP | 2021083183 A | | 5/2021 |
| JP | 2022148441 A | | 10/2022 |
| WO | 2022201725 A1 | | 9/2022 |

* cited by examiner

*Primary Examiner* — Ahmed Elnakib
(74) *Attorney, Agent, or Firm* — Maier & Maier, PLLC

(57) ABSTRACT

An annular silicon steel sheet, a circular wire motor assembly, a circular wire motor, and a powertrain. The annular silicon steel sheet includes a plurality of open slots, each open slot penetrates the silicon steel sheet in an axial direction of the silicon steel sheet, and a projection of each open slot in the axial direction of the silicon steel sheet includes a first curve segment, a second curve segment, and a third curve segment. The first curve segment and the third curve segment are oppositely arranged in a circumferential direction of the silicon steel sheet, a bending direction of the first curve segment is away from a bending direction of the third curve segment, and a bending direction of the second curve segment is away from an opening of the open slot. The open slots improve the performance of the circular wire motor and the powertrain.

19 Claims, 8 Drawing Sheets

ANNULAR SILICON STEEL SHEET, CIRCULAR WIRE MOTOR ASSEMBLY, CIRCULAR WIRE MOTOR, AND POWERTRAIN

CROSS-REFERENCE TO RELATED APPLICATIONS

This application claims priority to Chinese Patent Application No. 202310389627.X, filed on Apr. 4, 2023, which is hereby incorporated by reference in its entirety.

TECHNICAL FIELD

Embodiments relate to the field of motor technologies and to an annular silicon steel sheet, a circular wire motor assembly, a circular wire motor, and a powertrain.

BACKGROUND

Wires of motor windings are usually classified into two types: circular wires and flat wires. Based on the types of the wires, motors are classified into circular wire motors and flat wire motors. In the conventional technology, circular wires in a winding slot of a circular wire motor are prone to be distorted or twisted with each other. Consequently, the circular wires are arranged in disorder and have a large gap with each other, thereby affecting a slot fill factor of the circular wire motor and further affecting performance of the circular wire motor.

SUMMARY

Embodiments provide an annular silicon steel sheet, a circular wire motor, and a powertrain. An open slot in the annular silicon steel sheet is funnel-shaped, so that a winding slot in a circular wire motor assembly that is formed after a plurality of annular silicon steel sheets are adjacently arranged is funnel-shaped, thereby improving a slot fill factor of the circular wire motor, and further improving performance of the circular wire motor and the powertrain.

According to a first aspect, an embodiment provides an annular silicon steel sheet. The annular silicon steel sheet includes a plurality of open slots, each open slot penetrates the silicon steel sheet in an axial direction of the silicon steel sheet, and a projection of each open slot in the axial direction of the silicon steel sheet includes a first curve segment, a second curve segment, and a third curve segment. The first curve segment and the third curve segment are oppositely arranged in a circumferential direction of the silicon steel sheet, a bending direction of the first curve segment is away from a bending direction of the third curve segment, and a bending direction of the second curve segment is away from an opening of the open slot.

Both a slot wall and a slot bottom of the open slot in the annular silicon steel sheet provided in this embodiment include curve segments, so that a cross section of the open slot is funnel-shaped. Correspondingly, a plurality of annular silicon steel sheets are adjacently arranged to form a stator iron core or a rotor iron core, and a winding slot formed by connecting open slots of two adjacent silicon steel sheets is also funnel-shaped. When being squeezed, a plurality of circular wires in the winding slot may move towards two sides of the winding slot, thereby reducing a possibility that the circular wires in the winding slot are distorted or twisted. In addition, a gap between the circular wires in the winding slot can be reduced, so that the circular wires are arranged regularly, thereby improving a slot fill factor of the circular wire motor, and improving performance of the circular wire motor and the powertrain.

In an implementation, a maximum distance between the first curve segment and the third curve segment in the circumferential direction of the silicon steel sheet is greater than a maximum distance between two ends of the second curve segment. Correspondingly, in the annular silicon steel sheet provided in this embodiment, the open slot is a funnel-shaped slot with a wide middle and a narrow slot bottom. In the stator iron core or the rotor iron core formed by the plurality of annular silicon steel sheets, when being tightly pressed, the circular wires in the winding slot may move towards the two sides of the winding slot. This reduces rebound of the circular wire in the winding slot to a radial direction of an opening close to the winding slot, and reduces a possibility that the circular wires in the winding slot are distorted or twisted, thereby improving a slot fill factor of the circular wire motor, and improving performance of the circular wire motor and the powertrain.

In an implementation, the second curve segment includes a first curve sub-segment, a second curve sub-segment, and a third curve sub-segment. The first curve sub-segment and the third curve sub-segment are oppositely arranged along a central axis of the open slot; and curvatures of the first curve sub-segment, the second curve sub-segment, and the third curve sub-segment are the same. Correspondingly, in the annular silicon steel sheet provided in this embodiment, the cross section of the slot bottom of the open slot includes three curve sub-segments with a same curvature. In the stator iron core or the rotor iron core formed by the plurality of annular silicon steel sheets, three circular wires in the winding slot can be respectively tangent to the three curve sub-segments at the slot bottom, so that the circular wires in the winding slot are arranged more regularly. This helps improve a slot fill factor of the winding slot and performance of the circular wire motor.

In an implementation, the first curve sub-segment and the second curve sub-segment are connected through a straight line segment, and the second curve sub-segment and the third curve sub-segment are connected through a straight line segment. A length of the straight line segment is less than a curvature radius of the first curve sub-segment, the second curve sub-segment, or the third curve sub-segment. Correspondingly, in the annular silicon steel sheet provided in this embodiment, the three curve sub-segments at the slot bottom of the open slot are connected to each other by using a slender oblique surface. This can reduce a gap between the winding slot and the circular wire in the winding slot in the stator iron core or the rotor iron core that is formed by the plurality of annular silicon steel sheets. In addition, the circular wires in the winding slot are arranged more regularly, thereby helping improve a slot fill factor of winding slot and performance of the circular wire motor.

In an implementation, the first curve segment and the second curve segment are tangent at a joint, and the third curve segment and the second curve segment are tangent at a joint. The first curve segment and the third curve segment are symmetrically arranged along the central axis of the open slot, and the second curve segment is axisymmetric along the central axis of the open slot. Correspondingly, in the annular silicon steel sheet provided in this embodiment, the cross section of the open slot is an axisymmetric pattern, and the slot bottom is smoothly connected to the slot wall. In a stator assembly or a rotor assembly formed by the plurality of annular silicon steel sheets, a plurality of circular wires in a winding slot are arranged more regularly, thereby helping further improve a slot fill factor and performance of the circular wire motor.

According to a second aspect, an embodiment provides a circular wire motor assembly. The circular wire motor assembly includes an iron core, a winding and a plurality of groups of slot paper. The iron core includes a plurality of silicon steel sheets according to any one of the first aspect and the implementations of the first aspect, and the plurality of silicon steel sheets are adjacently arranged in an axial direction of the silicon steel sheets. A plurality of open slots of two adjacent silicon steel sheets are respectively connected to form a plurality of winding slots. Each winding slot is configured to accommodate a group of slot paper and a plurality of circular wires of the winding, and each circular wire of each winding slot passes through the winding slot in an axial direction of the iron core. Each group of slot paper is configured to wrap a plurality of circular wires in one winding slot.

The winding slot in the circular wire motor assembly provided in this embodiment is formed by connecting open slots of two adjacent annular silicon steel sheets, and a corresponding cross section of the winding slot is funnel-shaped. When squeezed, a plurality of circular wires in the winding slot may move towards two sides of the winding slot, thereby reducing a possibility that the circular wires in the winding slot are distorted or twisted. In addition, a gap between the circular wires in the winding slot can be reduced, so that the circular wires are arranged regularly, thereby improving a slot fill factor of the circular wire motor, and improving performance of the circular wire motor and the powertrain.

In an implementation, each winding slot in the circular wire motor assembly provided in this embodiment includes a slot bottom, and a projection of the slot bottom in the axial direction of the silicon steel sheet overlaps a projection of a second curve segment of the plurality of silicon steel sheets. The slot bottom is configured to arrange a first circular wire, a second circular wire, and a third circular wire. An outer circumferential surface of the second circular wire is separately in contact with an outer circumferential surface of the first circular wire and an outer circumferential surface of the third circular wire. The outer circumferential surface of the first circular wire, the outer circumferential surface of the second circular wire, and the outer circumferential surface of the third circular wire are separately in contact with the slot paper. A contact area between the outer circumferential surface of the first circular wire and the slot paper, a contact area between the outer circumferential surface of the second circular wire and the slot paper, and a contact area between the outer circumferential surface of the third circular wire and the slot paper are greater than a contact area between the outer circumferential surface of the second circular wire and the outer circumferential surface of the first circular wire and a contact area between the outer circumferential surface of the second circular wire and the outer circumferential surface of the third circular wire.

In the circular wire motor assembly provided in this embodiment, contact areas between the slot paper and the plurality of circular wires arranged at the slot bottom of the winding slot are respectively greater than contact areas between adjacent circular wires, thereby reducing gaps between the plurality of circular wires and the slot bottom, and helping improve a slot fill factor of circular wire motor.

In an implementation, a curvature of the outer circumferential surface that is of the first circular wire and that is in contact with the slot paper is less than or equal to a curvature of the first curve sub-segment in the second curve segment. A curvature of the outer circumferential surface that is of the second circular wire and that is in contact with the slot paper is less than or equal to a curvature of the second curve sub-segment in the second curve segment. A curvature of the outer circumferential surface that is of the third circular wire and that is in contact with the slot paper is less than or equal to a curvature of the third curve sub-segment in the second curve segment.

In the circular wire motor assembly provided in this embodiment, a curvature of an outer circumferential surface that is of each circular wire at the slot bottom of the winding slot and that is in contact with the slot paper is less than or equal to a curvature of a curve segment of the corresponding slot bottom, so that the winding in the winding slot can be pressed tightly in a radial direction away from the opening of the winding slot, and a contact area between the slot paper and each circular wire at the slot bottom of the winding slot is large, thereby helping improve a slot fill factor of the circular wire motor and performance of the circular wire motor.

In an implementation, each winding slot in the circular wire motor assembly provided in this embodiment includes two slot walls, and projections of the two slot walls in the axial direction of the silicon steel sheet respectively overlap projections of one first curve segment and one third curve segment of the plurality of silicon steel sheets. A fourth circular wire, a fifth circular wire, and a sixth circular wire are arranged between the two slot walls. In addition, an outer circumferential surface of the fourth circular wire is separately in contact with the slot paper and an outer circumferential surface of the fifth circular wire. An outer circumferential surface of the sixth circular wire is separately in contact with the slot paper and the fifth circular wire, and the outer circumferential surface of the fifth circular wire is spaced from the slot paper. A contact area between the outer circumferential surface of the fourth circular wire and the slot paper is greater than a contact area between the outer circumferential surface of the fourth circular wire and the outer circumferential surface of the fifth circular wire.

In the circular wire motor assembly provided in this embodiment, three circular wires in pair contact are disposed between the two slot walls of the winding slot. Circular wires on two sides of the three circular wires are in contact with the slot paper, and a contact area between the circular wire and the slot paper is greater than a contact area between adjacent circular wires. Correspondingly, in the circular wire motor assembly provided in this embodiment, when being squeezed, a plurality of circular wires in the winding slot may move towards two sides of the winding slot, thereby reducing a possibility that the circular wires in the winding slot are distorted or twisted. In addition, a gap between the circular wires in the winding slot can be reduced, so that the circular wires are arranged regularly, thereby improving a slot fill factor of the circular wire motor, and improving performance of the circular wire motor and the powertrain.

In an implementation, in a circumferential direction of the silicon steel sheet, a distance between a contact part between the outer circumferential surface of the fourth circular wire and the slot paper and a contact part between the outer circumferential surface of the sixth circular wire and the slot paper is greater than a distance between a contact part between the outer circumferential surface of the first circular wire and the slot paper and a contact part between the outer circumferential surface of the third circular wire and the slot paper.

In the circular wire motor assembly provided in this embodiment, the winding slot is a funnel-shaped slot with a wide middle and a narrow slot bottom. When tightly pressed, the circular wires in the winding slot may move towards the two sides of the winding slot. This reduces rebound of the circular wire in the winding slot to a radial direction of an opening close to the winding slot, and reduces a possibility that the circular wires in the winding slot are distorted or twisted, thereby improving a slot fill factor of the circular wire motor, and improving performance of the circular wire motor and the powertrain.

In an implementation, each group of slot paper includes slot side paper and slot cover paper. One side of the slot side paper is in contact with the slot bottom and the two slot walls; the other side of the slot side paper is in contact with the outer circumferential surface of each of the first circular wire, the third circular wire, the fourth circular wire, and the sixth circular wire; and the slot cover paper is configured to cooperate with the slot side paper to wrap the plurality of circular wires in one winding slot.

In an implementation, the plurality of circular wires include a seventh circular wire and an eighth circular wire. An outer circumferential surface of the seventh circular wire and an outer circumferential surface of the eighth circular wire are separately in contact with a surface that is of the slot cover paper and that is away from a slot opening of the winding slot. The outer circumferential surface of the seventh circular wire is spaced from the outer circumferential surface of the eighth circular wire, the outer circumferential surface of the seventh circular wire is spaced from the slot side paper by using the slot cover paper, and the outer circumferential surface of the eighth circular wire is spaced from the slot side paper by using the slot cover paper.

In an implementation, the plurality of circular wires include a ninth circular wire. An outer circumferential surface of the ninth circular wire is in contact with a surface that is of the slot cover paper and that is away from the slot opening of the winding slot, and the outer circumferential surface of the ninth circular wire is separately in contact with the outer circumferential surface of the seventh circular wire and the outer circumferential surface of the eighth circular wire.

According to a third aspect, an embodiment provides a circular wire motor. The circular wire motor includes a rotor assembly and the stator assembly according to any one of the first aspect and the implementations of the first aspect. Openings of a plurality of winding slots of the stator assembly face the rotor assembly. Alternatively, the circular wire motor includes a stator assembly and the rotor assembly according to any one of the first aspect and the implementations of the first aspect. Openings of a plurality of winding slots of the rotor assembly face the stator assembly.

According to a fourth aspect, an embodiment provides a powertrain. The powertrain includes a reducer and the circular wire motor according to the third aspect, and the reducer is in transmission connection to the circular wire motor.

For effects of the third aspect and the fourth aspect, refer to corresponding descriptions in the first aspect and/or the second aspect. Details are not described herein again.

DETAILED DESCRIPTION OF EMBODIMENTS

Figure 1:
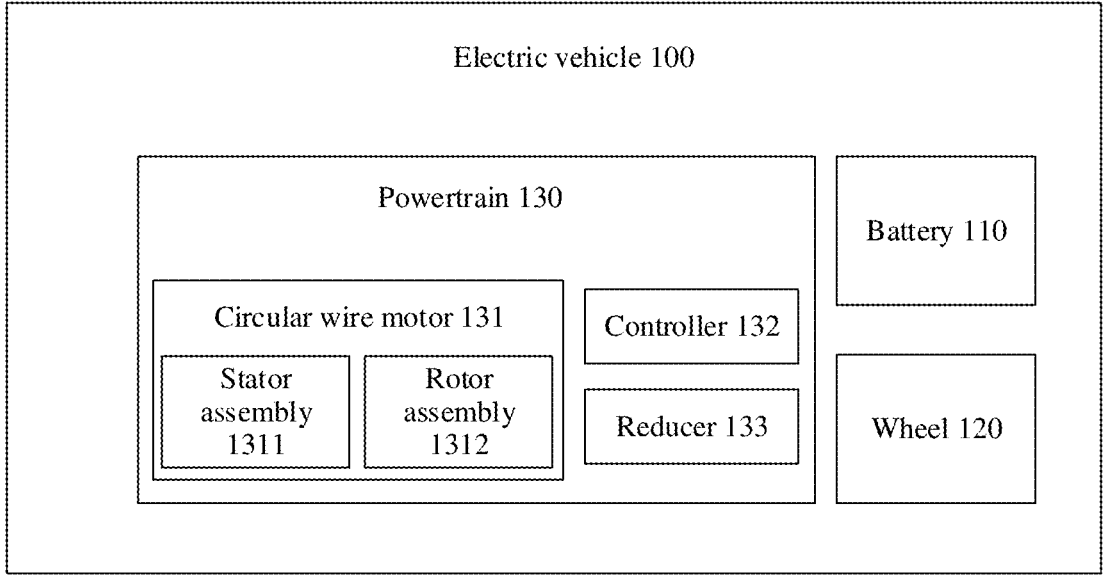
FIG. 1 is a schematic diagram of an electric vehicle according to an embodiment.

The following describes the solutions of embodiments with reference to accompanying drawings.

In the embodiments, "/" means "or" unless otherwise specified. For example, A/B may represent A or B. In the embodiments, "and/or" describes only an association relationship between associated objects and represents that three relationships may exist. For example, A and/or B may represent the following three cases: only A exists, both A and B exist, and only B exists.

In embodiments, prefix words such as "first", "second", "third", "fourth", and "fifth" are used only to distinguish between different described objects, and do not limit a location, a sequence, a priority, a quantity, content, or the like of the described objects. In embodiments, use of a prefix word like an ordinal number for distinguishing a described object does not constitute a limitation on the described object. For a description of the described object, refer to a description of the context in the embodiments. The use of such a prefix word should not constitute a redundant limitation. In addition, in the descriptions of embodiments, unless otherwise stated, "a plurality of" means two or more than two.

Reference to "some embodiments" or the like means that one or more embodiments include a particular feature, structure, or characteristic described in combination with the embodiments. Therefore, statements such as "in some embodiments" that appear at different places do not necessarily mean referring to a same embodiment. Instead, they mean "one or more but not all of embodiments", unless otherwise specifically emphasized in another manner. The terms "include", "comprise", "have", and their variants all mean "include, but are not limited to", unless otherwise specifically emphasized in another manner.

In the embodiments, an element described as being "vertical" is not being vertical in a strict sense, but being vertical within an allowed error range. Being "tangent" is not being tangent in a strict sense, but being tangent within an allowed error range.

In embodiments, a same reference numeral indicates a same component or a same part. In embodiments, for a plurality of same parts, it is possible that only one of the parts is marked with a reference numeral as an example in a figure. For another same part or component, the reference numeral is also applicable. In addition, a size of the part shown in the figure is merely an example.

In embodiments, a slot fill factor refers to a ratio of a cross-sectional area of a plurality of wires in a winding slot of a stator iron core or a rotor iron core to a cross-sectional area of an available winding slot. The ratio is expressed as a percentage. In embodiments, a quantity of turns is a quantity of wires in a winding slot of the stator iron core or the rotor iron core.

Wires of motor windings may be classified into two types: circular wires and flat wires. Based on the types of the wires, motors can be classified into circular wire motors and flat wire motors. In the conventional technology, circular wires in a winding slot of a circular wire motor are prone to be distorted or twisted with each other. Consequently, the circular wires are arranged in disorder and have a large gap with each other, thereby affecting a slot fill factor of the circular wire motor and further affecting performance of the circular wire motor.

In view of this, embodiments provide an annular silicon steel sheet, a circular wire motor assembly, a circular wire motor, and an electric vehicle. An open slot in the annular silicon steel sheet is funnel-shaped, so that a winding slot in the circular wire motor assembly that is formed after a plurality of annular silicon steel sheets are adjacently arranged is funnel-shaped, thereby improving a slot fill factor of the circular wire motor, and further improving performance of the circular wire motor and the powertrain.

FIG. 1 is a schematic diagram of an electric vehicle according to an embodiment. As shown in FIG. 1, an electric vehicle 100 provided in this embodiment includes a battery 110, wheels 120, and one or more powertrains 130. The powertrain 130 is configured to: receive power supplied by the battery 110 and drive the wheels 120.

The electric vehicle provided in this embodiment includes a pure electric vehicle/battery electric vehicle (pure EV/battery EV), a hybrid electric vehicle (HEV), a range extended electric vehicle (REEV), a plug-in hybrid electric vehicle (PHEV), a new energy vehicle (NEV), or the like.

The powertrain 130 provided in this embodiment includes a circular wire motor 131 and a reducer 133. The reducer 133 is in transmission connection to the circular wire motor 131. The reducer 133 is configured to be in transmission connection to the circular wire motor 131 and the wheels 120.

In an embodiment, the powertrain 130 includes the circular wire motor 131, a controller 132, and the reducer 133. The controller 132 is configured to control the circular wire motor 131 to work. For example, the controller 132 is configured to control start or stop, forward rotation or backward rotation, rotation speed increase or decrease, driving torque increase or decrease, braking torque increase or decrease, and the like of the circular wire motor 131.

The circular wire motor 131 provided in this embodiment includes a stator assembly 1311 and a rotor assembly 1312. The stator assembly 1311 and the rotor assembly 1312 are coaxially arranged along an axis of the circular motor 131. The rotor assembly 1312 is configured to axially rotate around the circular wire motor 131 relative to the stator assembly 1311.

The circular wire motor assembly provided in this embodiment includes a stator assembly or a rotor assembly.

In an embodiment, the circular wire motor assembly provided is the stator assembly 1311. The stator assembly 1311 is sleeved on the rotor assembly 1312. The stator assembly 1311 includes a stator iron core, a stator winding, and a plurality of groups of slot paper. The stator iron core includes a plurality of annular silicon steel sheets. The plurality of annular silicon steel sheets are adjacently arranged in an axial direction of the annular silicon steel sheet. Each annular silicon steel sheet includes a plurality of open slots, and each open slot penetrates the silicon steel sheet in the axial direction of the annular silicon steel sheet.

An opening of each open slot faces a circle center of the annular silicon steel sheet. A plurality of open slots of two adjacent annular silicon steel sheets are respectively connected to form a plurality of winding slots. An opening of each winding slot faces the rotor assembly. Each winding slot is configured to accommodate a group of slot paper and a plurality of circular wires of the stator winding, each circular wire in each winding slot passes through the winding slot in an axial direction of the stator iron core, and each group of slot paper is configured to wrap a plurality of circular wires in one winding slot.

In an embodiment, the circular wire motor assembly provided is the rotor assembly 1312. The rotor assembly 1312 is sleeved on the stator assembly 1311. The rotor assembly 1312 of the circular wire motor 131 includes a rotor core, a rotor winding, and a plurality of slot paper. The rotor iron core includes a plurality of silicon steel sheets. The plurality of silicon steel sheets are adjacently arranged in an axial direction of the silicon steel sheet. The silicon steel sheet includes a plurality of open slots, and each open slot penetrates the annular silicon steel sheet in an axial direction of the annular silicon steel sheet. An opening of each open slot faces a circle center of the annular silicon steel sheet. A plurality of open slots of two adjacent annular silicon steel sheets are respectively connected to form a plurality of winding slots. An opening of each winding slot faces the stator assembly. Each winding slot is configured to accommodate a group of slot paper and a plurality of circular wires of the rotor winding, each circular wire in each winding slot passes through the winding slot in an axial direction of the rotor iron core, and each group of slot paper is configured to wrap a plurality of circular wires in one winding slot.

In this embodiment, an axial direction of the motor, the rotor assembly, the stator assembly, the rotor iron core, or the stator iron core is a central axis direction. A circumferential direction of the motor, the rotor assembly, the stator assembly, the rotor core, or the stator core is a rotation direction centered on a central axis. A radial direction of the motor, the rotor assembly, the stator assembly, the rotor core, or the stator core is a direction perpendicular to the central axis.

In the annular silicon steel sheet provided in this embodiment, a projection of each open slot in the axial direction of the annular silicon steel sheet includes a first curve segment, a second curve segment, and a third curve segment. The first curve segment and the third curve segment are oppositely arranged in a circumferential direction of the silicon steel sheet, a bending direction of the first curve segment is away from a bending direction of the third curve segment, and a bending direction of the second curve segment is away from an opening of the open slot.

Figure 2:
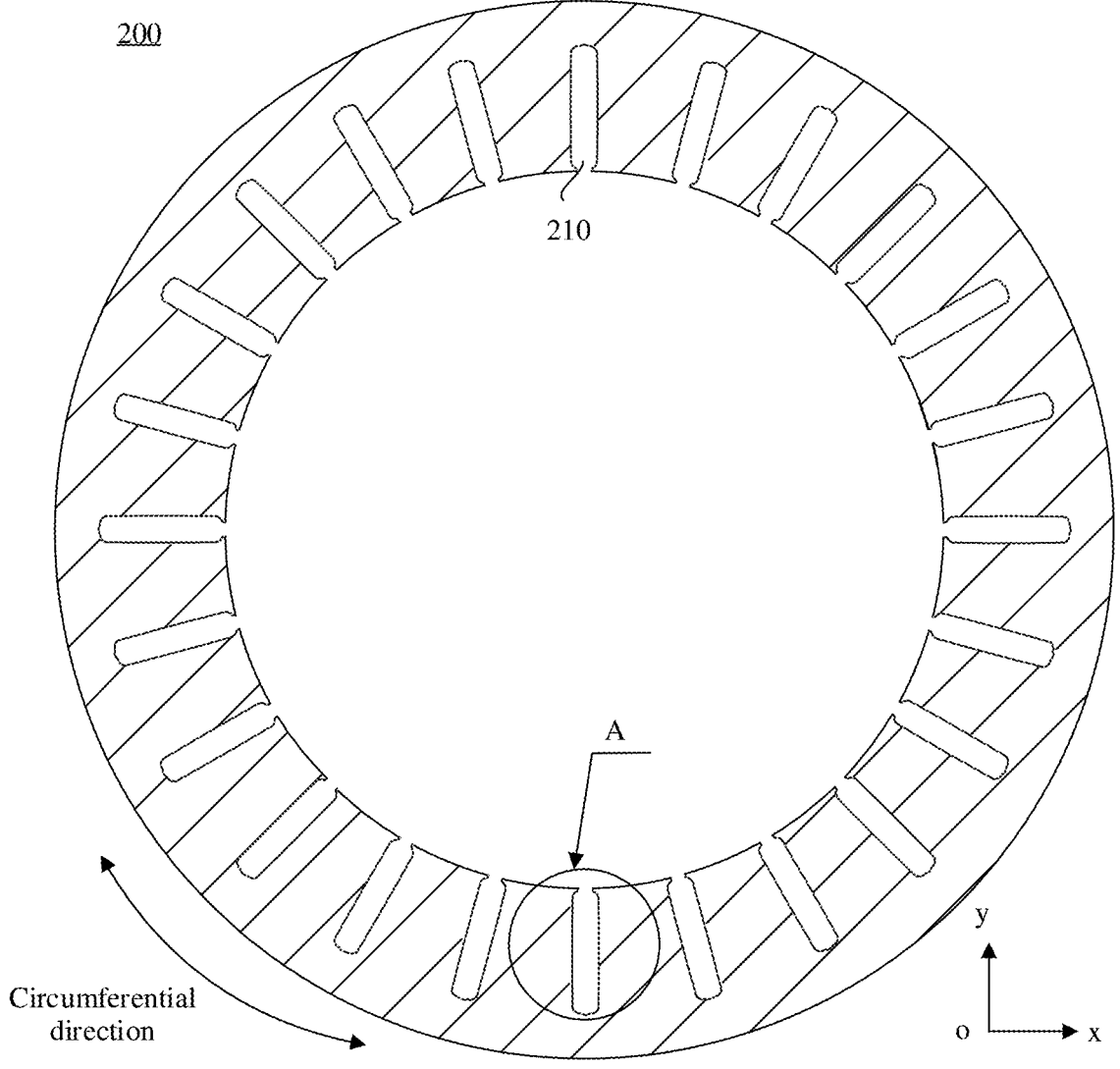
FIG. 2 is a schematic diagram of an annular silicon steel sheet according to an embodiment.
Figure 3:
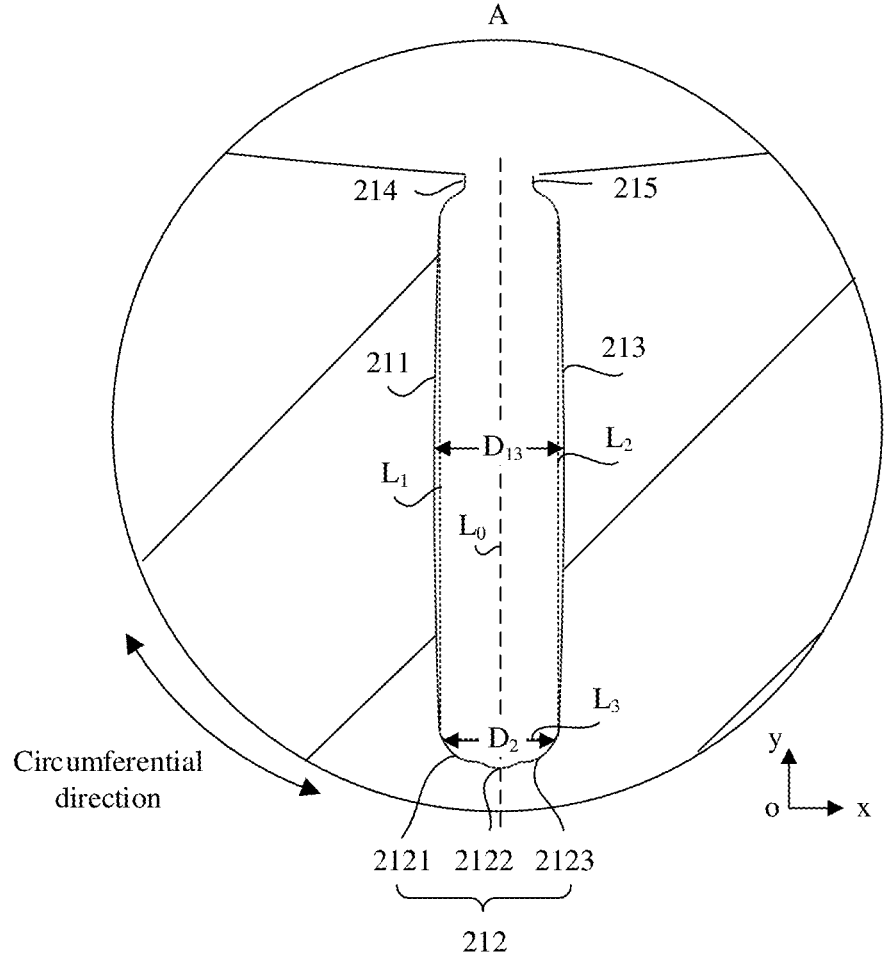
FIG. 3 is an enlarged schematic diagram of a part A of the annular silicon steel sheet shown in FIG. 2.
Figure 4:
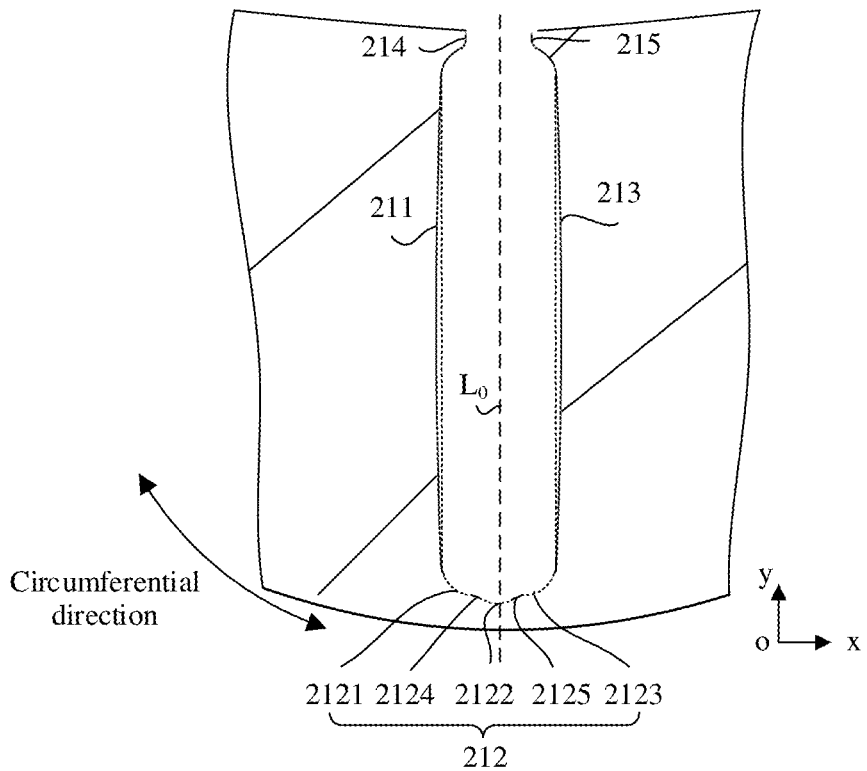
FIG. 4 is a partial schematic diagram of a cross section of an annular silicon steel sheet according to an embodiment.

The following describes in detail an annular silicon steel sheet 200 provided in an embodiment with reference to FIG. 2 to FIG. 4.

FIG. 2 is a schematic diagram of an annular silicon steel sheet according to an embodiment. As shown in FIG. 2, the annular silicon steel sheet 200 includes a plurality of open slots 210. Each open slot 210 penetrates the annular silicon steel sheet 200 in an axial direction of the annular silicon steel sheet 200. In an embodiment, as shown in FIG. 2 to FIG. 4, an opening of each open slot 210 faces a circle center of the annular silicon steel sheet 200. In an embodiment, the opening of each open slot 210 is away from the circle center of the annular silicon steel sheet 200.

In this embodiment, the axial direction of the annular silicon steel sheet 200 is a direction perpendicular to an xoy plane shown in FIG. 2. The axial direction of the annular silicon steel sheet 200 may alternatively be referred to as a thickness direction of the annular silicon steel sheet 200.

In this embodiment, the plurality of open slots 210 are equally spaced in a circumferential direction of the silicon steel sheet 200, and shapes of all the open slots 210 are the same.

FIG. 3 is an enlarged schematic diagram of a part A of the annular silicon steel sheet shown in FIG. 2. As shown in FIG. 3, a projection of each open slot 210 in the axial direction of the annular silicon steel sheet 200 includes a first curve segment 211, a second curve segment 212, and a third curve segment 213. The first curve segment 211 and the third curve segment 213 are oppositely arranged in the circumferential direction of the annular silicon steel sheet 200, and a bending direction of the first curve segment 211 is away from a bending direction of the third curve segment 213. A bending direction of the second curve segment 212 is away from an opening of the open slot 210.

As shown in FIG. 3, a vertical line segment $L_1$ is a straight line segment parallel to a y-axis, a vertical line segment $L_2$ is a straight line segment parallel to the y-axis, and a horizontal line segment $L_3$ is a straight line segment parallel to an x-axis. The first curve segment 211 bends along the vertical line segment $L_1$ towards a negative x-axis direction, and the third curve segment 213 bends along the vertical line segment $L_2$ towards a positive x-axis direction. The second curve segment 212 bends along the horizontal line segment $L_3$ towards a negative y-axis direction. A first curve sub-segment 2121 and a third curve sub-segment 2123 are oppositely arranged along a central axis $L_0$ of the open slot 210.

In this embodiment, the first curve segment 211 may be understood as a projection of one side wall of the open slot 210 in the axial direction of the annular silicon steel sheet 200. The second curve segment 212 may be understood as a projection of a slot bottom of the open slot 210 in the axial direction of the annular silicon steel sheet 200. The third curve segment 213 may be understood as a projection of the other side wall of the open slot 210 in the axial direction of the annular silicon steel sheet 200.

In this embodiment, both the two slot walls and the slot bottom of the open slot 210 in the annular silicon steel sheet include curve segments, so that the open slot 210 is funnel-shaped. The annular silicon steel sheet 200 in this embodiment is configured to form the stator iron core or the rotor iron core of the circular wire motor 131. For example, a plurality of annular silicon steel sheets 200 are adjacently arranged in the axial direction of the annular silicon steel 200, to form the stator iron core or the rotor iron core. Open slots 210 of two adjacent annular silicon steel sheets 200 are connected to form a winding slot. Correspondingly, the plurality of annular silicon steel sheets 200 are adjacently arranged to form the stator iron core or the rotor iron core, and the winding slot formed by connecting the open slots 210 of the two adjacent annular silicon steel sheets 200 are also funnel-shaped.

In the stator iron core or the rotor iron core formed by the annular silicon steel sheets provided in this embodiment, when being squeezed in a radial direction of the annular silicon steel sheet 200, a plurality of circular wires in the winding slot may move towards two sides of the winding slot, thereby reducing a possibility that the circular wires in the winding slot are distorted or twisted. In addition, a gap between the circular wires can be reduced, so that the circular wires are arranged regularly, thereby improving a slot fill factor of the circular wire motor 131, and improving performance of the circular wire motor 131 and the powertrain 130.

As shown in FIG. 3, in the circumferential direction of the silicon steel sheet 200, a maximum distance $D_{13}$ between the first curve segment 211 and the third curve segment 213 is greater than a maximum distance $D_2$ between two ends of the second curve segment 212. In some embodiments, a cross section of the open slot 210 of the annular silicon steel sheet 200 is a funnel-shaped cross section with a wide middle and a narrow slot bottom. The cross section of the open slot 210 is a section perpendicular to the axial direction of the annular silicon steel sheet 200.

In this embodiment, the open slot 210 in the annular silicon steel sheet is a funnel-shaped slot with a wide middle and a narrow slot bottom. Correspondingly, in the stator iron core or the rotor iron core formed by the annular silicon steel sheets provided in this embodiment, the winding slot is a funnel-shaped slot with a wide middle and a narrow slot bottom. When being tightly pressed, the circular wires in the winding slot may move towards the two sides of the winding slot. This reduces rebound of the circular wire in the winding slot to a radial direction of an opening close to the winding slot, and reduces a possibility that the circular wires in the winding slot are distorted or twisted, thereby improving a slot fill factor of the circular wire motor 131.

In this embodiment, in the projection of the open slot 210 of the annular silicon steel sheet 200 in the axial direction of the annular silicon steel sheet 200, the second curve segment 212 includes a plurality of curve sub-segments. In an embodiment, the second curve segment 212 includes three curve sub-segments. In an embodiment, the second curve segment 212 includes five curve sub-segments.

In an embodiment, the second curve segment 212 includes the first curve sub-segment 2121, a second curve sub-segment 2122, and the third curve sub-segment 2123. Curvatures of the first curve sub-segment 2121, the second curve sub-segment 2122, and the third curve sub-segment 2123 are the same.

Correspondingly, in the annular silicon steel sheet 200 provided in this embodiment, a cross section of the slot bottom of the open slot 210 includes three curve sub-segments with a same curvature. In the stator iron core or the rotor iron core formed by the plurality of annular silicon steel sheets 200, three circular wires in the winding slot can be respectively tangent to the three curve sub-segments at the slot bottom, so that the circular wires in the winding slot are arranged more regularly. This helps improve a slot fill factor of the winding slot and performance of the circular wire motor 131.

In an embodiment, the first curve sub-segment 2121 and the second curve sub-segment 2122 are connected through a straight line segment, and the second curve sub-segment 2122 and the third curve sub-segment 2123 are connected through a straight line segment. A length of the straight line segment is less than a curvature radius of the first curve sub-segment 2121, the second curve sub-segment 2122, or the third curve sub-segment 2123.

FIG. 4 is a partial schematic diagram of a cross section of an annular silicon steel sheet according to an embodiment. As shown in FIG. 4, the second curve segment 212 includes the first curve sub-segment 2121, the second curve sub-segment 2122, the third curve sub-segment 2123, a first straight line sub-segment 2124, and a second straight line sub-segment 2125. The first straight line sub-segment 2124 is connected to the first curve sub-segment 2121 and the second curve sub-segment 2122, and the second straight line sub-segment 2125 is connected to the second curve sub-segment 2122 and the third curve sub-segment 2123.

In an embodiment, a length of the first straight line sub-segment 2124 is less than the curvature radius of the first curve sub-segment 2121, the second curve sub-segment 2122, or the third curve sub-segment 2123, and a length of the second straight line sub-segment 2125 is less than the curvature radius of the first curve sub-segment 2121, the second curve sub-segment 2122, or the third curve sub-segment 2123. In other words, in the axial direction of the annular silicon steel sheet 200, the three curve sub-segments at the slot bottom of the open slot 210 are connected to each other by using a slender oblique surface.

In the annular silicon steel sheet 200 provided in this embodiment, the three curve sub-segments at the slot bottom of the open slot 210 are connected to each other by using a slender oblique surface. This can reduce a gap between the winding slot and the circular wire in the winding slot in the stator iron core or the rotor iron core that is formed by the plurality of annular silicon steel sheets 200. In addition, the circular wires in the winding slot are arranged more regularly, thereby helping improve a slot fill factor of winding slot and performance of the circular wire motor 131.

In an embodiment, the first curve segment 211 and the second curve segment 212 are tangent at a joint, and the third curve segment 213 and the second curve segment 212 are tangent at a joint. In addition, along the central axis $L_0$ of the open slot 210, the first curve segment 211 and the third curve segment 213 are symmetrically arranged, and the second curve segment 212 is axisymmetric.

As shown in FIG. 3 and FIG. 4, in addition to the first curve segment 211, the second curve segment 212, and the third curve segment 213, the projection of each open slot 210 in the axial direction of the annular silicon steel sheet 200 further includes a first straight line segment 214 and a second straight line segment 215. The first straight line segment 214 is connected to a side that is of the first curve segment 211 and that is close to the open slot 210, and the first straight line segment 214 and the first curve segment 211 are tangent at a joint. The second straight line segment 215 is connected to a side that is of the third curve segment 213 and that is close to the open slot 210, and the second straight line segment 215 and the third curve segment 213 are tangent at a joint.

In the annular silicon steel sheet 200 provided in this embodiment, the cross section of the open slot 210 is an axisymmetric pattern, and the slot bottom is smoothly connected to the slot wall. In a stator assembly or a rotor assembly formed by the plurality of annular silicon steel sheets 200, a plurality of circular wires in a winding slot are arranged more regularly, thereby helping further improve a slot fill factor and performance of the circular wire motor 131.

The following describes in detail a circular wire motor assembly 300 provided in an embodiment with reference to FIG. 5 to FIG. 8.

In an embodiment, the circular wire motor assembly 300 shown in FIG. 5 to FIG. 8 is the stator assembly 1311. Correspondingly, an iron core 310 described below is a stator iron core of the stator assembly 1311, a winding 320 described below is a stator winding of the stator assembly 1311, and a winding slot 311 described below is a stator winding slot of the stator assembly 1311.

In an embodiment, the circular wire motor assembly 300 shown in FIG. 5 to FIG. 8 is the rotor assembly 1312. Correspondingly, an iron core 310 described below is a rotor iron core of the rotor assembly 1312, a winding 320 described below is a rotor winding of the rotor assembly 1312, and a winding slot 311 described below is a rotor winding slot of the rotor assembly 1312.

Figure 5:
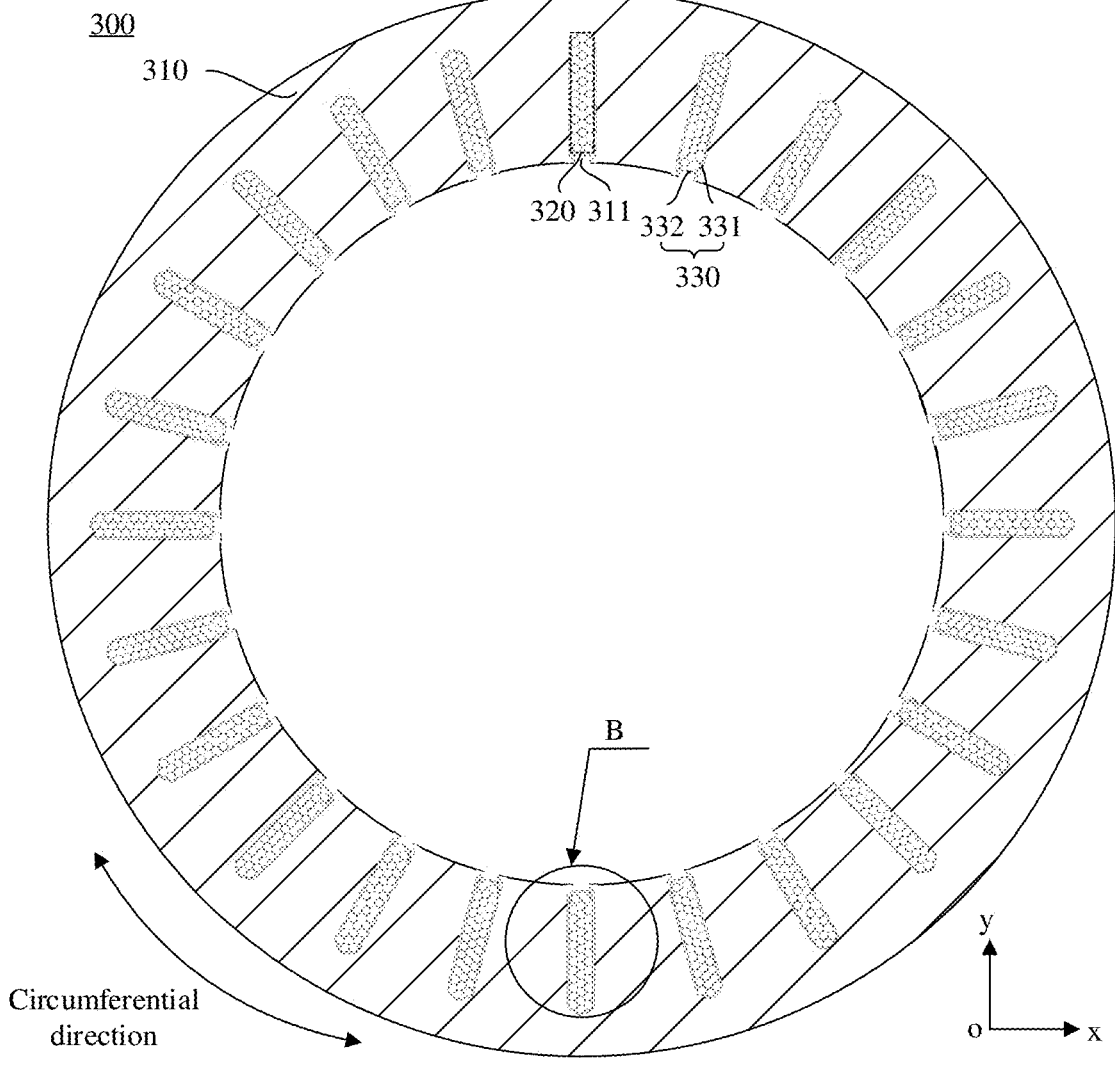
FIG. 5 is a schematic diagram of a cross section of a circular wire motor assembly according to an embodiment.
Figure 6:
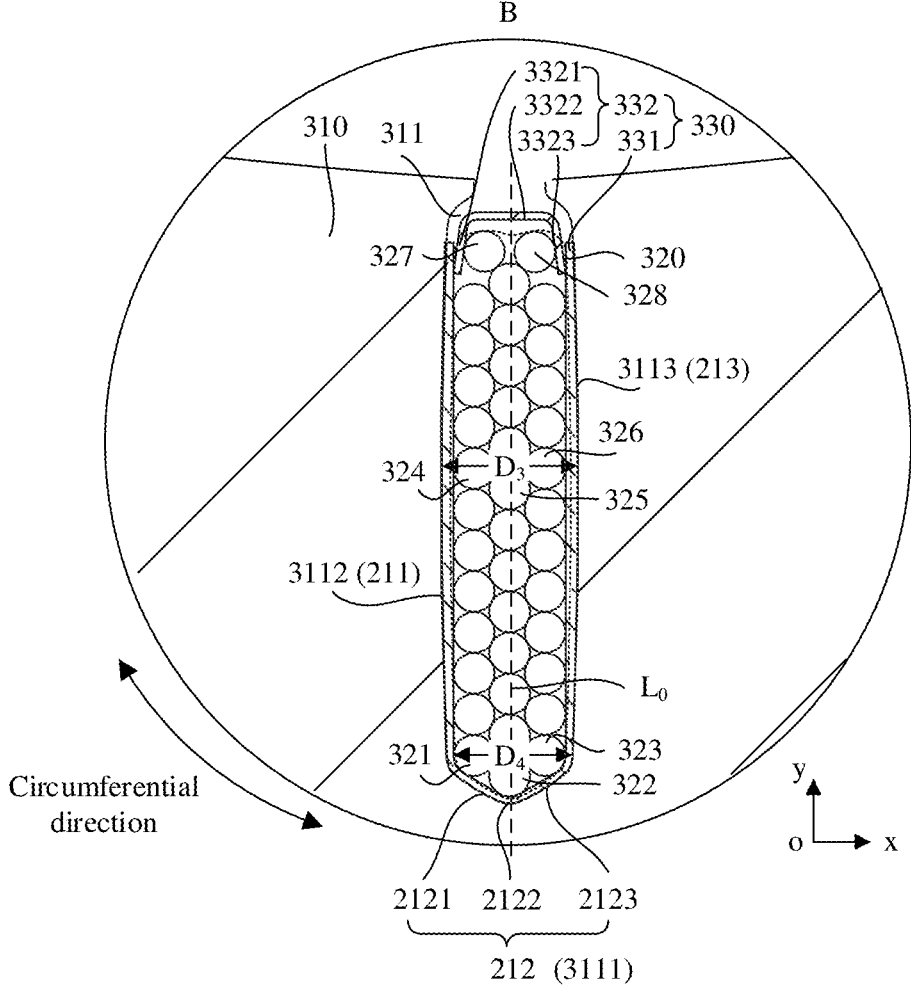
FIG. 6 is an enlarged schematic diagram of a part B of the circular wire motor assembly shown in FIG. 5.
Figure 7:
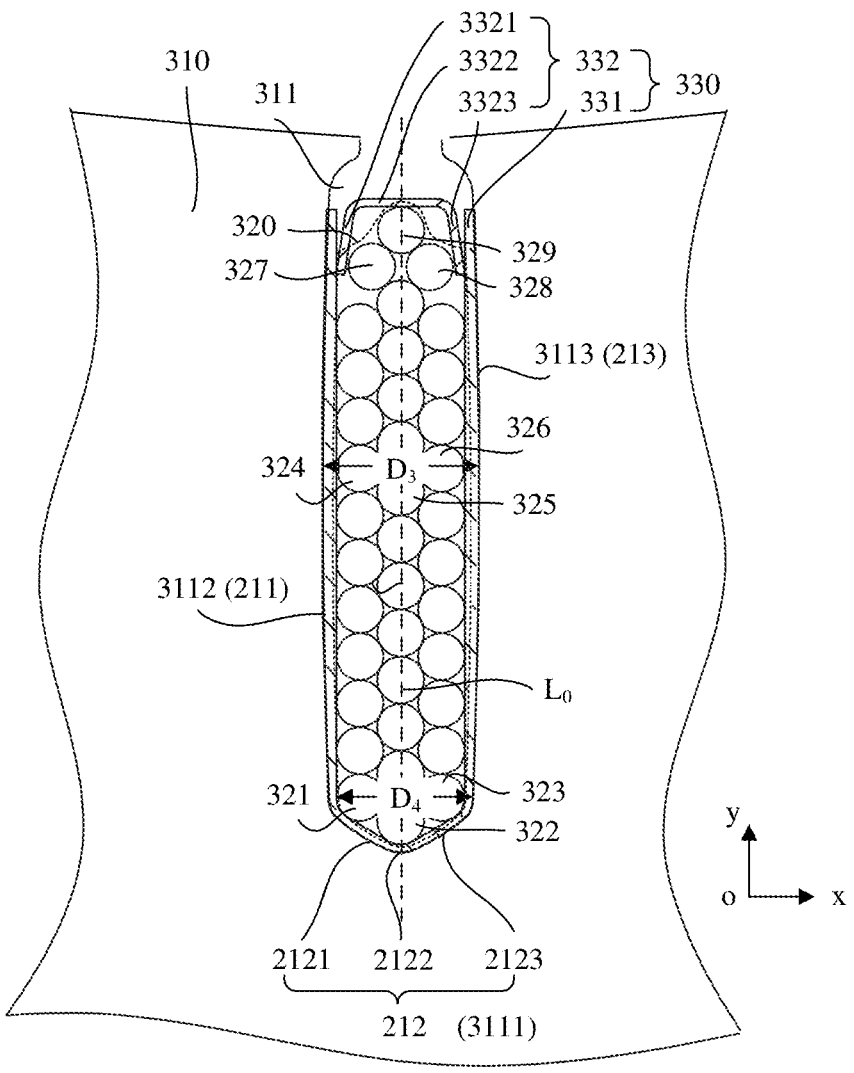
FIG. 7 is a partial schematic diagram of a cross section of a circular wire motor assembly according to an embodiment.
Figure 8:
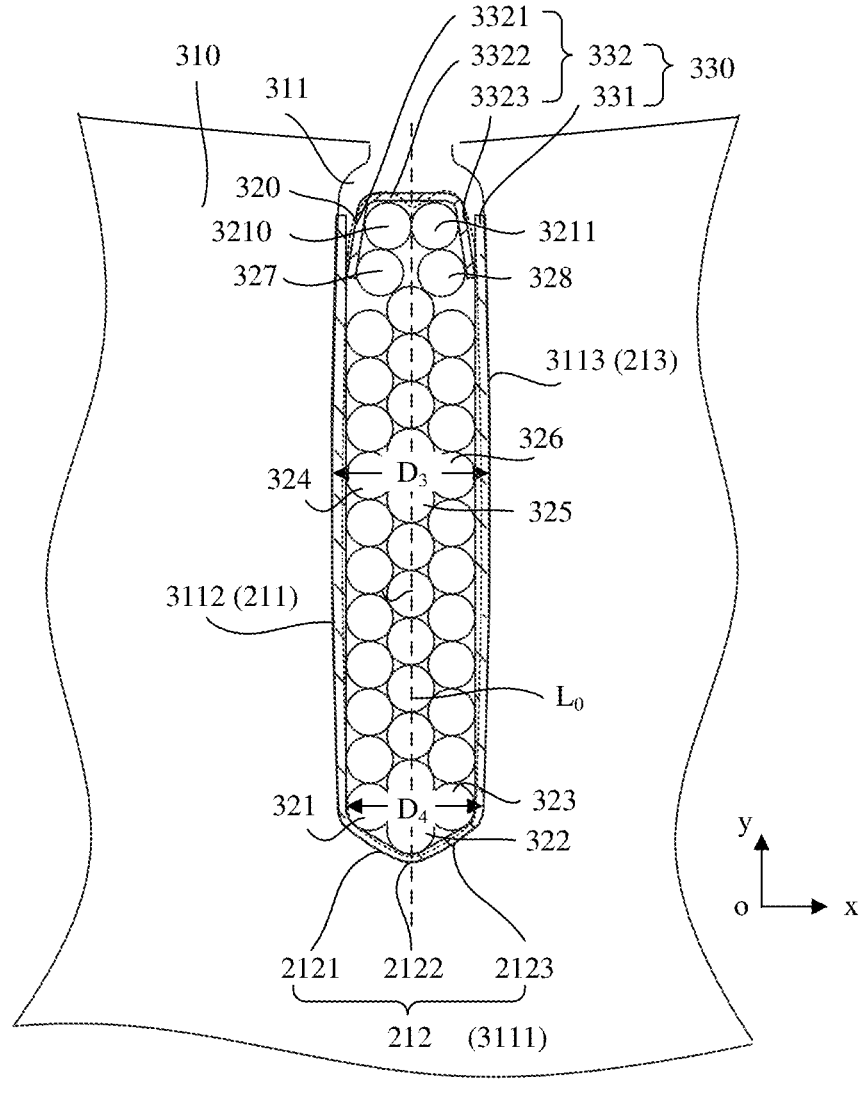
FIG. 8 is another partial schematic diagram of a cross section of a circular wire motor assembly according to an embodiment.

FIG. 5 is a schematic diagram of a cross section of a circular wire motor assembly according to an embodiment. FIG. 6 is an enlarged schematic diagram of a part B of the circular wire motor assembly shown in FIG. 5. FIG. 7 is a partial schematic diagram of a cross section of a circular wire motor assembly according to an embodiment. FIG. 8 is another partial schematic diagram of a cross section of a circular wire motor assembly according to an embodiment.

The circular wire motor assembly 300 provided in this embodiment includes the iron core 310, the winding 320, and a plurality of groups of slot paper 330. The iron core 310 includes a plurality of annular silicon steel sheets 200 described above. The plurality of annular silicon steel sheets 200 are adjacently arranged in the axial direction of the annular silicon steel sheet 200, and a plurality of open slots 210 of two adjacent annular silicon steel sheets 200 are respectively connected to form a plurality of winding slots 311. In this embodiment, a plurality of open slots 210 in the annular silicon steel sheet 200 are equally spaced in a circumferential direction of the annular silicon steel sheet. Correspondingly, the plurality of winding slots 311 in the circular wire motor assembly 300 are equally spaced in a circumferential direction of the iron core 310.

In this embodiment, an axial direction of the iron core 310 is a direction perpendicular to an xoy plane shown in FIG. 5. The iron core 310 includes a plurality of annular silicon steel sheets 200 that are adjacently arranged in the axial direction of the annular silicon steel sheet 200. Correspondingly, the axial direction of the annular silicon steel sheet 200 is the same as the axial direction of the iron core 310, and the circumferential direction of the annular silicon steel sheet 200 is the same as the circumferential direction of the iron core 310.

Each winding slot 311 is configured to accommodate a group of slot paper 330 and a plurality of circular wires of the winding 320. Each circular wire of each winding slot 311 passes through the winding slot 311 in the axial direction of the iron core 310. Each group of slot paper 330 wraps a plurality of circular wires in one winding slot 311. In addition, each group of slot paper 330 isolates a plurality of circular wires of the winding 220 from the outside, to achieve insulation.

As shown in FIG. 6, one winding slot 311 is configured to fasten 3n circular wires. As shown in FIG. 7, one winding slot 311 is configured to fasten (3n+1) circular wires. As shown in FIG. 8, one winding slot 311 is configured to fasten (3n+2) circular wires. n is a natural number.

In an embodiment, an opening of each open slot 210 faces a circle center of the annular silicon steel sheet 200, and an opening of the winding slot 311 faces a circle center of the iron core 310. In an embodiment, the opening of each open slot 210 is away from the circle center of the annular silicon steel sheet 200, and the opening of the winding slot 311 is away from the circle center of the iron core 310.

In the circular wire motor assembly 300 provided in this embodiment, the winding slot 311 is formed by connecting open slots 210 of two adjacent annular silicon steel sheets 200. The two slot walls and the slot bottom of the winding slot 311 all include curve segments. Correspondingly, in the circular wire motor assembly 300 provided in this embodiment, a cross section of the winding slot 311 is funnel-shaped, so that a slot fill factor of the circular wire motor 131 can be improved, and performance of the circular wire motor 131 and the powertrain 130 is further improved.

In this embodiment, cross sections of a plurality of circular wires in the winding 320 are the same. A resistor of the circular wire in the winding slot in the circular wire motor 131 satisfies R=ρL/S, where ρ is resistivity of the circular wire, L is a length of the circular wire, and S is a cross-sectional area of the circular wire. Correspondingly, an increase in the cross-sectional area S of the circular wire may reduce the resistor of the circular wire. In this embodiment, increasing the cross-sectional area of the circular wire is also referred to as increasing a copper full factor of the circular wire.

In a winding slot of circular wire motor 131, a larger cross-sectional area of a circular wire indicates a higher copper fill factor, and a larger cross-sectional area of the circular wire causes an increase in a gap between the circular wires and a decrease in a slot fill factor. Both the slot fill factor and the copper fill factor may be considered for the circular wire motor assembly 300 formed by the annular silicon steel sheets 200 provided in this embodiment.

As shown in FIG. 6 to FIG. 8, a plurality of circular wires in one winding slot 311 in the circular wire motor 131 are arranged at a plurality of layers, and three to five circular wires are arranged in parallel at each layer. For example, three to five circular wires are arranged at each layer in a slot width direction of the winding slot 311. The slot width direction of the winding slot 311 may be understood as the circumferential direction of the iron core 310.

As shown in FIG. 6 to FIG. 8, each winding slot 311 includes a slot bottom 3111. In the axial direction of the annular silicon steel sheet 200, a projection of the slot bottom 3111 overlaps a projection of one second curve segment 212 of the plurality of annular silicon steel sheets 200.

In this embodiment, the plurality of circular wires and the second curve segment 212 are adjacently arranged in the slot width direction of the winding slot 311, and the plurality of circular wires of the winding slot 311 are respectively tangent to a plurality of curve sub-segments of the second curve segment 212, so that the circular wires in the winding slot 311 are arranged regularly. In this way, a gap between the circular wires is reduced, and further, both the slot fill factor and the copper fill factor of the circular wire motor 131 are considered.

As shown in FIG. 6, the slot bottom 3111 is configured to arrange a first circular wire 321, a second circular wire 322, and a third circular wire 323. An outer circumferential surface of the second circular wire 322 is separately in contact with an outer circumferential surface of the first circular wire 321 and an outer circumferential surface of the third circular wire 323. The outer circumferential surface of the first circular wire 321, the outer circumferential surface of the second circular wire 322, and the outer circumferential surface of the third circular wire 323 are separately in contact with the slot paper. A contact area between the outer circumferential surface of the first circular wire 321 and the slot paper 330, a contact area between the outer circumferential surface of the second circular wire 322 and the slot paper 330, and a contact area between the outer circumferential surface of the third circular wire 323 and the slot paper 330 are greater than a contact area between the outer circumferential surface of the second circular wire 322 and the outer circumferential surface of the first circular wire 321 and a contact area between the outer circumferential surface of the second circular wire 322 and the outer circumferential surface of the third circular wire 323.

In the circular wire motor assembly provided in this embodiment, contact areas between the slot paper and the plurality of circular wires arranged at the slot bottom of the winding slot 311 are respectively greater than contact areas between adjacent circular wires, thereby reducing gaps between the plurality of circular wires and the slot bottom, and helping improve a slot fill factor of circular wire motor 131.

In some embodiments, a distance $D_4$ between a contact part between the outer circumferential surface of the first circular wire 321 and the slot paper 330 and a contact part between the outer circumferential surface of the third circular wire 323 and the slot paper 330 satisfies $(d_1+d_2)<D_4<(d_1+d_2+d_3)$, where $d_1$ is a radius of a cross section of the first circular wire 321, $d_2$ is a radius of a cross section of the second circular wire 322, and $d_3$ is a radius of a cross section of the third circular wire 323. For example, $D_4$ satisfies $$D_4 = \left[(2 + \sqrt{3})(d_1 + d_3) + 2\sqrt{3}\, d_2\right]/4.$$

In some embodiments, a curvature of the outer circumferential surface that is of the first circular wire 321 and that is in contact with the slot paper 330 is less than or equal to a curvature of the first curve sub-segment 2121 in the second curve segment 212. A curvature of the outer circumferential surface that is of the second circular wire 322 and that is in contact with the slot paper 330 is less than or equal to a curvature of the second curve sub-segment 2122 in the second curve segment 212. A curvature of the outer circumferential surface that is of the third circular wire 323 and that is in contact with the slot paper 330 is less than or equal to a curvature of the third curve sub-segment 2123 in the second curve segment 212.

In the circular wire motor assembly provided in this embodiment, a curvature of an outer circumferential surface that is of each circular wire at the slot bottom of the winding slot 311 and that is in contact with the slot paper is less than or equal to a curvature of a curve segment of the corresponding slot bottom, so that the winding in the winding slot 311 can be pressed tightly in a radial direction away from the opening of the winding slot 311, and a contact area between the slot paper and each circular wire at the slot bottom of the winding slot 311 is large, thereby helping improve a slot fill factor of the circular wire motor 131 and performance of the circular wire motor 131.

As shown in FIG. 6 to FIG. 8, each winding slot 311 includes two slot walls, and projections of the two slot walls in the axial direction of the silicon steel sheet 200 respectively overlap projections of one first curve segment 211 and one third curve segment 213 of the plurality of silicon steel sheets 200. A fourth circular wire 324, a fifth circular wire 325, and a sixth circular wire 326 are arranged between a first slot wall 3112 and a second slot wall 3113. An outer circumferential surface of the fourth circular wire 324 is separately in contact with the slot paper 330 and an outer circumferential surface of the fifth circular wire 325. An outer circumferential surface of the sixth circular wire 326 is separately in contact with the slot paper 330 and the fifth circular wire 325. The outer circumferential surface of the fifth circular wire 325 is spaced from the slot paper 330. A contact area between the outer circumferential surface of the fourth circular wire 324 and the slot paper 330 is greater than a contact area between the outer circumferential surface of the fourth circular wire 324 and the outer circumferential surface of the fifth circular wire 325. Alternatively, a contact area between the outer circumferential surface of the sixth circular wire 326 and the slot paper 330 is greater than a contact area between the outer circumferential surface of the sixth circular wire 326 and the outer circumferential surface of the fifth circular wire 325.

In the circular wire motor assembly provided in this embodiment, a plurality of circular wires in pair contact are disposed between the two slot walls of the winding slot 311. A contact area between a circular wire on either side of the plurality of circular wires and the slot paper is greater than a contact area between adjacent circular wires. Correspondingly, in the circular wire motor assembly provided in this embodiment, when being squeezed, a plurality of circular wires in the winding slot 311 may move towards two sides of the winding slot 311, thereby reducing a possibility that the circular wires in the winding slot 311 are distorted or twisted. In addition, a gap between the circular wires in the winding slot 311 can be reduced, so that the circular wires are arranged regularly, thereby improving a slot fill factor of the circular wire motor 131, and improving performance of the circular wire motor 131 and the powertrain 130.

As shown in FIG. 6 to FIG. 8, two side walls of each winding slot 311 are respectively the first slot wall 3112 and the second slot wall 3113. In the axial direction of the annular silicon steel sheet 200, a projection of the first slot wall 3112 overlaps a projection of one first curve segment 211 of the plurality of annular silicon steel sheets 200. In the axial direction of the annular silicon steel sheet 200, a projection of the second slot wall 3113 overlaps a projection of one third curve segment 213 of the plurality of annular silicon steel sheets 200.

In some embodiments, in a circumferential direction of the annular silicon steel sheet 200, a distance $D_3$ between a contact part between the outer circumferential surface of the fourth circular wire 324 and the slot paper 330 and a contact part between the outer circumferential surface of the sixth circular wire 326 and the slot paper 330 is greater than a distance $D_4$ between a contact part between the outer circumferential surface of the first circular wire 321 and the slot paper 330 and a contact part between the outer circumferential surface of the third circular wire 323 and the slot paper 330. In other words, in a circumferential direction of the iron core 310, a span of a middle winding of the winding slot 311 is greater than a span of a winding of the slot bottom 3111 of the winding slot 311. In this way, when the winding 320 in the winding slot 311 is wrapped by the slot cover paper 332, and the winding 320 is squeezed by the slot cover paper 332, the winding 320 may be pressed tightly in the winding slot 311 in a radial direction away from the opening of the winding slot 311, and does not spring back in a radial direction close to the opening of the winding slot 311. Further, this helps further improve a slot fill factor of the winding slot 311.

In some embodiments, a distance $D_3$ between a contact part between the outer circumferential surface of the fourth circular wire 324 and the slot paper 330 and a contact part between the outer circumferential surface of the sixth circular wire 326 and the slot paper 330 satisfies $D_3 > [(2+\sqrt{3})(d_4+d_6)+2\sqrt{3}d_5]/d_4$, where $d_4$ is a radius of a cross section of the fourth circular wire 324, $d_5$ is a radius of a cross section of the fifth circular wire 325, and do is a radius of a cross section of the sixth circular wire 326.

As shown in FIG. 6 to FIG. 8, each group of slot paper 330 includes slot side paper 331 and slot cover paper 332. One side of the slot side paper 331 is in contact with the slot bottom 3111, the first slot wall 3112, and the second slot wall 3113; and the other side of the slot side paper 331 is in contact with the outer circumferential surface of each of the first circular wire 321, the third circular wire 323, the fourth circular wire 324, and the sixth circular wire 326. The slot cover paper 332 is configured to cooperate with the slot side paper 331 to wrap a plurality of circular wires in one winding slot 311.

As shown in FIG. 6, the plurality of circular wires include a seventh circular wire 327 and an eighth circular wire 328. An outer circumferential surface of the seventh circular wire 327 and an outer circumferential surface of the eighth circular wire 328 are separately in contact with a surface that is of the slot cover paper 332 and that is away from a slot opening of the winding slot 311. The outer circumferential surface of the seventh circular wire 327 is spaced from the outer circumferential surface of the eighth circular wire 328, the outer circumferential surface of the seventh circular wire 327 is spaced from the slot side paper 331 by using the slot cover paper 332, and the outer circumferential surface of the eighth circular wire 328 is spaced from the slot side paper 331 by using the slot cover paper 332.

For example, as shown in FIG. 6, it is assumed that the slot cover paper 332 includes a first bent portion 3321, a body 3322, and a second bent portion 3323 that are sequentially connected. The first bent portion 3321 and the second bent portion 3323 are respectively bent in a direction of the body 3322 away from the slot opening of the winding slot 311. In this case, the outer circumferential surface of the seventh circular wire 327 is in contact with a surface that is of the first bent portion 3321 and that is away from the slot opening of the winding slot 311. The outer circumferential surface of the eighth circular wire 328 is in contact with a surface that is of the second bent portion 3323 and that is away from the slot opening of the winding slot 311.

In an example, as shown in FIG. 7, the plurality of circular wires further include a ninth circular wire 329. An outer circumferential surface of the ninth circular wire 329 is in contact with a surface that is of the slot cover paper 332 and that is away from the slot opening of the winding slot 311. The outer circumferential surface of the ninth circular wire 329 is separately in contact with the outer circumferential surface of the seventh circular wire 327 and the outer circumferential surface of the eighth circular wire 328.

For example, as shown in FIG. 7, the outer circumferential surface of the ninth circular wire 329 is in contact with a surface that is of the body 3322 and that is away from the slot opening of the winding slot 311.

In another example, as shown in FIG. 8, the plurality of circular wires further include a tenth circular wire 3210 and an eleventh circular wire 3211. An outer circumferential surface of the tenth circular wire 3210 is separately in contact with the outer circumferential surface of the seventh circular wire 327, an outer circumferential surface of the eleventh circular wire 3211, and the surface that is of the slot cover paper 332 and that is away from the slot opening of the winding slot 311. The outer circumferential surface of the eleventh circular wire 3211 is separately in contact with the outer circumferential surface of the eighth circular wire 328 and the surface that is of the slot cover paper 332 and that is away from the slot opening of the winding slot 311.

For example, as shown in FIG. 8, the outer circumferential surface of the tenth circular wire 3210 is separately in contact with the surface that is of the first bent portion 3321 and that is away from the slot opening of the winding slot 311, and the surface that is of the body 3322 and that is away from the slot opening of the winding slot 311. The outer circumferential surface of the eleventh circular wire 3211 is separately in contact with the surface that is of the second bent portion 3323 and that is away from the slot opening of the winding slot 311, and the surface that is of the body 3322 and that is away from the slot opening of the winding slot 311.

With reference to Table 1, performance of a circular wire motor 1 in the conventional technology is compared with performance of a circular wire motor 2 provided in the embodiments. Parameters of the circular wire motor 1 and the circular wire motor 2 are listed in Table 1.

Both the circular wire motor 1 and the circular wire motor 2 are 6p54s (where 6p represents that a quantity of poles of the motor is 6, and 54s represents that the motor has 54 winding slots in total). In addition, the circular wire motor 1 and the circular wire motor 2 have a same rotor side parameter, a same air gap length, same stator inner and outer diameters, a same winding form, and a same quantity of turns. A winding slot of the circular wire motor 1 is a tapered slot, and a winding slot used in the circular wire motor 2 is a funnel-shaped slot. The funnel-shaped slot is the winding slot 311 described above.

TABLE 1

| Circular wire motor | Winding slot shape | Coil quantity | Copper area (mm$^2$) | Slot area (mm$^2$) | Copper fill factor | Peak torque (N · m) | Peak power (kW) | Working condition efficiency |
|---|---|---|---|---|---|---|---|---|
| Circular wire motor 1 | Tapered slot | 85 | 31.78 | 68.88 | 46% | 350 | 198 | 94.94% |
| Circular wire motor 2 | Funnel-shaped slot | 30 | 39.41 | 65.68 | 60% (+14%) | 361 (+11) | 200 (+2) | 95.28% (+0.34%) |

It may be understood from Table 1 that the copper fill factor, the peak torque, the peak power, and the working condition efficiency of the circular wire motor 2 provided in embodiments are all improved. In addition, because an axial length of a motor is proportional to a torque, correspondingly, compared with the circular wire motor 1, the circular wire motor 2 with a same axial size may provide larger output torque. Compared with the circular wire motor 1, the circular wire motor 2 with a same output torque has a smaller axial size.

In addition, according to the winding 320 in the circular wire motor assembly 300 provided in the embodiments, a quantity of circular wires wound in parallel or a quantity of turns connected in series to the winding 320 in each winding slot 311 can be changed. Therefore, flexible configuration of an output requirement of the circular wire motor 131 can be implemented.

For example, one winding slot 311 accommodates 30 circular wires. A quantity of turns connected in series, a quantity of wires wound in parallel, a total quantity of circular wires, and a copper fill factor of the circular wires in the winding slot 311 are shown in Table 2.

It may be understood from Table 2 that the winding 320 in the circular wire motor assembly 300 provided in embodiments can support a plurality of winding forms. The winding form may be determined by a quantity of turns of circular wires connected in series in each slot and a quantity of circular wires wound in parallel. Correspondingly, according to the circular wire motor assembly 300 provided in embodiments, a quantity of circular wires wound in parallel or a quantity of turns connected in series to the winding 320 in each winding slot 311 can be flexibly changed, thereby improving compatibility of the circular wire motor 131.

TABLE 2

| Quantity of turns of circular wires connected in series in each slot | Quantity of circular wires wound in parallel | Total quantity of circular wires in each slot | Copper fill factor |
|---|---|---|---|
| 2 | 15 | 30 | 60% |
| 3 | 10 | 30 | 60% |
| 4 | 7 | 28 | 56% |
| 5 | 6 | 30 | 60% |
| 6 | 5 | 30 | 60% |
| 7 | 4 | 28 | 56% |
| 8 | 3 | 24 | 48% |
| 9 | 3 | 27 | 54% |
| 10 | 3 | 30 | 60% |
| 11 | 2 | 22 | 44% |
| 12 | 2 | 24 | 48% |
| 13 | 2 | 26 | 52% |
| 14 | 2 | 28 | 56% |
| 15 | 2 | 30 | 60% |

The foregoing descriptions are merely implementations of the embodiments, but the scope of the embodiments is not limited thereto. Any variation or replacement readily figured out by a person skilled in the art fall within the scope of the embodiments.

What is claimed is:

1. An annular silicon steel sheet, wherein the silicon steel sheet comprises a plurality of open slots, each open slot penetrates the silicon steel sheet in an axial direction of the silicon steel sheet, and a projection of each open slot in the axial direction of the silicon steel sheet comprises a first curve segment, a second curve segment, and a third curve segment, wherein the first curve segment and the third curve segment are oppositely arranged in a circumferential direction of the silicon steel sheet, a bending direction of the first curve segment is away from a bending direction of the third curve segment, and a bending direction of the second curve segment is away from an opening of the open slot;

the second curve segment comprises a first curve sub-segment, a second curve sub-segment, and a third curve sub-segment, the first curve sub-segment and the second curve sub-segment are connected through a straight line segment, the second curve sub-segment and the third curve sub-segment are connected through a straight line segment, and a length of the straight line segment is less than a curvature radius of the first curve sub-segment, the second curve sub-segment, or the third curve sub-segment.

2. The silicon steel sheet according to claim 1, wherein a maximum distance between the first curve segment and the third curve segment in the circumferential direction of the silicon steel sheet is greater than a maximum distance between two ends of the second curve segment.

3. The silicon steel sheet according to claim 1, wherein the first curve sub-segment and the third curve sub-segment are oppositely arranged along a central axis of the open slot; and curvatures of the first curve sub-segment, the second curve sub-segment, and the third curve sub-segment are the same.

4. The silicon steel sheet according to claim 1, wherein the first curve segment and the second curve segment are tangent at a joint, the third curve segment and the second curve segment are tangent at a joint, the first curve segment and the third curve segment are symmetrically arranged along a central axis of the open slot, and the second curve segment is axisymmetric along the central axis of the open slot.

5. A circular wire motor assembly, wherein the assembly comprises an iron core, a winding, and a plurality of groups of slot paper; the iron core comprises a plurality of silicon steel sheets, the plurality of silicon steel sheets are adjacently arranged in an axial direction of the silicon steel sheets; a plurality of open slots of two adjacent silicon steel sheets of the plurality of steel sheets are respectively connected to form a plurality of winding slots; each winding slot is configured to accommodate a group of slot paper and a plurality of circular wires of the winding slot; each circular wire of each winding slot passes through the winding slot in an axial direction of the iron core; and each group of slot paper is configured to wrap a plurality of circular wires in one winding slot;

each silicon steel sheet of the plurality of steel sheets comprises a plurality of open slots, each open slot penetrates the silicon steel sheet in an axial direction of the silicon steel sheet, and a projection of each open slot in the axial direction of the silicon steel sheet comprises a first curve segment, a second curve segment, and a third curve segment, wherein the first curve segment and the third curve segment are oppositely arranged in a circumferential direction of the silicon steel sheet, a bending direction of the first curve segment is away from a bending direction of the third curve segment, and a bending direction of the second curve segment is away from an opening of the open slot; and the second curve segment comprises a first curve sub-segment, a second curve sub-segment, and a third curve sub-segment, the first curve sub-segment and the second curve sub-segment are connected through a straight line segment, the second curve sub-segment and the third curve sub-segment are connected through a straight line segment, and a length of the straight line segment is less than a curvature radius of the first curve sub-segment, the second curve sub-segment, or the third curve sub-segment.

6. The assembly according to claim 5, wherein each winding slot comprises a slot bottom; a projection of the slot bottom in the axial direction of the silicon steel sheet overlaps a projection of a second curve segment of the plurality of silicon steel sheets; and the slot bottom is configured to arrange a first circular wire, a second circular wire, and a third circular wire, wherein an outer circumferential surface of the second circular wire is separately in contact with an outer circumferential surface of the first circular wire and an outer circumferential surface of the third circular wire; the outer circumferential surface of the first circular wire, the outer circumferential surface of the second circular wire, and the outer circumferential surface of the third circular wire are separately in contact with the slot paper; and a contact area between the outer circumferential surface of the first circular wire and the slot paper, a contact area between the outer circumferential surface of the second circular wire and the slot paper, and a contact area between the outer circumferential surface of the third circular wire and the slot paper are greater than a contact area between the outer circumferential surface of the second circular wire and the outer circumferential surface of the first circular wire and a contact area between the outer circumferential surface of the second circular wire and the outer circumferential surface of the third circular wire.

7. The assembly according to claim 6, wherein a curvature of the outer circumferential surface that is of the first circular wire and that is in contact with the slot paper is less than or equal to a curvature of a first curve sub-segment in the second curve segment, a curvature of the outer circumferential surface that is of the second circular wire and that is in contact with the slot paper is less than or equal to a curvature of a second curve sub-segment in the second curve segment, and a curvature of the outer circumferential surface that is of the third circular wire and that is in contact with the slot paper is less than or equal to a curvature of a third curve sub-segment in the second curve segment.

8. The assembly according to claim 6, wherein each winding slot comprises two slot walls; projections of the two slot walls in the axial direction of the silicon steel sheet respectively overlap a projection of a first curve segment of the plurality of silicon steel sheets and a projection of a third curve segment of the plurality of silicon steel sheets; and a fourth circular wire, a fifth circular wire, and a sixth circular wire are arranged between the two slot walls, wherein an outer circumferential surface of the fourth circular wire is separately in contact with the slot paper and an outer circumferential surface of the fifth circular wire, an outer circumferential surface of the sixth circular wire is separately in contact with the slot paper and the fifth circular wire, an outer circumferential surface of the fifth circular wire is spaced from the slot paper, and a contact area between the outer circumferential surface of the fourth circular wire and the slot paper is greater than a contact area between the outer circumferential surface of the fourth circular wire and the outer circumferential surface of the fifth circular wire.

9. The assembly according to claim 8, wherein in a circumferential direction of the silicon steel sheet, a distance between a contact part between the outer circumferential surface of the fourth circular wire and the slot paper and a contact part between the outer circumferential surface of the sixth circular wire and the slot paper is greater than a distance between a contact part between the outer circumferential surface of the first circular wire and the slot paper and a contact part between the outer circumferential surface of the third circular wire and the slot paper.

10. The assembly according to claim 8, wherein each group of slot paper comprises slot side paper and slot cover paper; one side of the slot side paper is in contact with the slot bottom and the two slot walls; the other side of the slot side paper is in contact with the outer circumferential surface of each of the first circular wire, the third circular wire, the fourth circular wire, and the sixth circular wire; and the slot cover paper is configured to cooperate with the slot side paper to wrap the plurality of circular wires in one winding slot.

11. The assembly according to claim 10, wherein the plurality of circular wires comprise a seventh circular wire and an eighth circular wire, an outer circumferential surface of the seventh circular wire and an outer circumferential surface of the eighth circular wire are separately in contact with a surface that is of the slot cover paper and that is away from a slot opening of the winding slot, the outer circumferential surface of the seventh circular wire is spaced from the outer circumferential surface of the eighth circular wire, the outer circumferential surface of the seventh circular wire is spaced from the slot side paper by using the slot cover paper, and the outer circumferential surface of the eighth circular wire is spaced from the slot side paper by using the slot cover paper.

12. The assembly according to claim 11, wherein the plurality of circular wires comprise a ninth circular wire, an outer circumferential surface of the ninth circular wire is in contact with a surface that is of the slot cover paper and that is away from the slot opening of the winding slot, and the outer circumferential surface of the ninth circular wire is separately in contact with the outer circumferential surface of the seventh circular wire and the outer circumferential surface of the eighth circular wire.

13. A circular wire motor, comprising:
    a rotor assembly and a stator assembly, wherein the stator assembly comprises an iron core, a winding, and a plurality of groups of slot paper; the iron core comprises a plurality of silicon steel sheets, the plurality of silicon steel sheets are adjacently arranged in an axial direction of the silicon steel sheets; a plurality of open slots of two adjacent silicon steel sheets are respectively connected to form a plurality of winding slots; each winding slot is configured to accommodate a group of slot paper and a plurality of circular wires of the winding slot; each circular wire of each winding slot passes through the winding slot in an axial direction of the iron core; and each group of slot paper is configured to wrap a plurality of circular wires in one winding slot; and
    the silicon steel sheet comprises a plurality of open slots, each open slot penetrates the silicon steel sheet in an axial direction of the silicon steel sheet, and a projection of each open slot in the axial direction of the silicon steel sheet comprises a first curve segment, a second curve segment, and a third curve segment, wherein
    the first curve segment and the third curve segment are oppositely arranged in a circumferential direction of the silicon steel sheet, a bending direction of the first curve segment is away from a bending direction of the third curve segment, and a bending direction of the second curve segment is away from an opening of the open slot, and openings of a plurality of winding slots of the stator assembly face the rotor assembly; or
    a rotor assembly and a stator assembly, wherein the rotor assembly comprises an iron core, a winding, and a plurality of groups of slot paper; the iron core comprises a plurality of silicon steel sheets, the plurality of silicon steel sheets are adjacently arranged in an axial direction of the silicon steel sheets; a plurality of open slots of two adjacent silicon steel sheets are respectively connected to form a plurality of winding slots; each winding slot is configured to accommodate a group of slot paper and a plurality of circular wires of the winding slot; each circular wire of each winding slot passes through the winding slot in an axial direction of the iron core; and each group of slot paper is configured to wrap a plurality of circular wires in one winding slot; and
    the silicon steel sheet comprises a plurality of open slots, each open slot penetrates the silicon steel sheet in an axial direction of the silicon steel sheet, and a projection of each open slot in the axial direction of the silicon steel sheet comprises a first curve segment, a second curve segment, and a third curve segment, wherein
    the first curve segment and the third curve segment are oppositely arranged in a circumferential direction of the silicon steel sheet, a bending direction of the first curve segment is away from a bending direction of the third curve segment, and a bending direction of the second curve segment is away from an opening of the open slot, and openings of a plurality of winding slots of the rotor assembly face the stator assembly.

14. The circular wire motor according to claim 13, wherein each winding slot comprises a slot bottom; a projection of the slot bottom in the axial direction of the silicon steel sheet overlaps a projection of a second curve segment of the plurality of silicon steel sheets; and the slot bottom is configured to arrange a first circular wire, a second circular wire, and a third circular wire, wherein
    an outer circumferential surface of the second circular wire is separately in contact with an outer circumferential surface of the first circular wire and an outer circumferential surface of the third circular wire; the outer circumferential surface of the first circular wire, the outer circumferential surface of the second circular wire, and the outer circumferential surface of the third circular wire are separately in contact with the slot paper; and a contact area between the outer circumferential surface of the first circular wire and the slot paper, a contact area between the outer circumferential surface of the second circular wire and the slot paper, and a contact area between the outer circumferential surface of the third circular wire and the slot paper are greater than a contact area between the outer circumferential surface of the second circular wire and the outer circumferential surface of the first circular wire and a contact area between the outer circumferential surface of the second circular wire and the outer circumferential surface of the third circular wire.

15. The circular wire motor according to claim 13, wherein a curvature of the outer circumferential surface that is of the first circular wire and that is in contact with the slot paper is less than or equal to a curvature of a first curve sub-segment in the second curve segment, a curvature of the outer circumferential surface that is of the second circular wire and that is in contact with the slot paper is less than or equal to a curvature of a second curve sub-segment in the second curve segment, and a curvature of the outer circumferential surface that is of the third circular wire and that is in contact with the slot paper is less than or equal to a curvature of a third curve sub-segment in the second curve segment.

16. The circular wire motor according to claim 13, wherein each winding slot comprises two slot walls; projections of the two slot walls in the axial direction of the silicon steel sheet respectively overlap a projection of a first curve segment of the plurality of silicon steel sheets and a projection of a third curve segment of the plurality of silicon steel sheets; and a fourth circular wire, a fifth circular wire, and a sixth circular wire are arranged between the two slot walls, wherein
    an outer circumferential surface of the fourth circular wire is separately in contact with the slot paper and an outer circumferential surface of the fifth circular wire, an outer circumferential surface of the sixth circular wire is separately in contact with the slot paper and the fifth circular wire, an outer circumferential surface of the fifth circular wire is spaced from the slot paper, and a contact area between the outer circumferential surface of the fourth circular wire and the slot paper is greater than a contact area between the outer circumferential surface of the fourth circular wire and the outer circumferential surface of the fifth circular wire.

17. The circular wire motor according to claim 13, wherein in a circumferential direction of the silicon steel sheet, a distance between a contact part between the outer circumferential surface of the fourth circular wire and the slot paper and a contact part between the outer circumferential surface of the sixth circular wire and the slot paper is greater than a distance between a contact part between the outer circumferential surface of the first circular wire and the slot paper and a contact part between the outer circumferential surface of the third circular wire and the slot paper.

18. The circular wire motor according to claim 13, wherein each group of slot paper comprises slot side paper and slot cover paper; one side of the slot side paper is in contact with the slot bottom and the two slot walls; the other side of the slot side paper is in contact with the outer circumferential surface of each of the first circular wire, the third circular wire, the fourth circular wire, and the sixth circular wire; and the slot cover paper is configured to cooperate with the slot side paper to wrap the plurality of circular wires in one winding slot.

19. A powertrain, comprising a reducer and the circular wire motor according to claim 13, wherein the reducer is in transmission connection to the circular wire motor.

* * * * *